(12) United States Patent
Aasberg-Petersen et al.

(10) Patent No.: US 8,765,019 B2
(45) Date of Patent: Jul. 1, 2014

(54) PROCESS FOR THE PREPARATION OF SYNTHESIS GAS

(75) Inventors: Kim Aasberg-Petersen, Allerød (DK); Poul Erik Højlund Nielsen, Frederiksberg (DK); Peter Seier Christensen, Virum (DK); Charlotte Stub Nielsen, Holte (DK); Burcin Temel, Hellerup (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/701,488

(22) PCT Filed: May 13, 2011

(86) PCT No.: PCT/EP2011/002378
§ 371 (c)(1),
(2), (4) Date: Nov. 30, 2012

(87) PCT Pub. No.: WO2011/151012
PCT Pub. Date: Dec. 8, 2011

(65) Prior Publication Data
US 2013/0082211 A1    Apr. 4, 2013

(30) Foreign Application Priority Data
Jun. 1, 2010 (DK) .................. 2010 00474

(51) Int. Cl.
*C01B 3/48* (2006.01)
(52) U.S. Cl.
USPC ........................................... 252/373

(58) Field of Classification Search
None
See application file for complete search history.

(56) References Cited

U.S. PATENT DOCUMENTS

| | | | |
|---|---|---|---|
| 2007/0105962 A1* | 5/2007 | Basini et al. .................. | 518/702 |
| 2007/0231221 A1* | 10/2007 | Aasberg-Petersen et al. ............... | 422/129 |
| 2008/0237090 A1 | 10/2008 | Musich et al. | |
| 2009/0186952 A1 | 7/2009 | Steynberg et al. | |
| 2009/0232729 A1* | 9/2009 | Genkin et al. ................ | 423/651 |
| 2009/0247800 A1* | 10/2009 | Davis et al. .................. | 585/275 |

FOREIGN PATENT DOCUMENTS

| | | |
|---|---|---|
| EP | 1 860 063 A1 | 11/2007 |
| EP | 1860063 A1 * | 11/2007 |
| WO | WO 01/42175 A1 | 6/2001 |

* cited by examiner

*Primary Examiner* — Melvin C Mayes
*Assistant Examiner* — Douglas Call
(74) *Attorney, Agent, or Firm* — Dickstein Shapiro LLP

(57) ABSTRACT

Process for the preparation of synthesis gas from an essentially dry hydrocarbon feedstock (1) comprising olefins, hydrogen and carbon monoxide, the process comprising the steps: (a) selectively hydrogenating the olefins in the hydrocarbon feedstock at a temperature between 60 to 190° C. (2) to obtain a hydrogenated hydrocarbon feedstock comprising hydrogen, carbon monoxide and saturated hydrocarbons (3; b) adding steam (4) to the hydrogenated hydrocarbon feedstock; (c) performing a water gas shift reaction in the presence of steam on the hydrogenated hydrocarbon feedstock (6) to obtain a shifted, hydrogenated hydrocarbon mixture; (d) converting the shifted, hydrogenated hydrocarbon mixture (8) to obtain a synthesis gas.

9 Claims, 2 Drawing Sheets

PROCESS FOR THE PREPARATION OF SYNTHESIS GAS

The invention relates to a process for preparation of synthesis gas from an essentially dry hydrocarbon feedstock comprising olefins, hydrogen and carbon monoxide. The process for preparation of synthesis gas comprises the steps of hydrogenating and shifting the hydrocarbon feedstock to obtain a hydrogenated, shifted hydrocarbon feedstock. The hydrogenated, shifted hydrocarbon feedstock is subsequently converted to a synthesis gas. In particular the invention concerns a process whereby hydrogenation of olefins present in the hydrocarbon feed is carried out at low temperatures. The synthesis gas produced is suitable for use in the synthesis of hydrocarbons by for example the Fischer-Tropsch process or the methanol-to-olefins (MTO) process.

In the Fischer-Tropsch hydrocarbon synthesis stage, the synthesis gas is reacted using a Fischer-Tropsch catalyst to produce hydrocarbon products consisting of a range of recovered compounds which can comprise from one carbon atom to over 100 carbon atoms. Fischer-Tropsch processes are well-known in the art for applications using synthesis gas that may be derived from a variety of carbon-containing feedstock sources, e.g. coal, petroleum coke, biomass, natural gas and the like.

For the optimum selectivity performance in the Fischer-Tropsch hydrocarbon synthesis stage it is in most cases desirable that the hydrogen to carbon monoxide molar ratio in the fresh synthesis gas feed is about 2.0.

Most of the hydrocarbons produced in the Fischer-Tropsch hydrocarbon synthesis stage are olefins (unsaturated hydrocarbons) and paraffins (saturated hydrocarbons). Other less desirable components that may be present in the effluent from a Fischer-Tropsch reactor are carbon dioxide, water, and oxygenates. The oxygenates may include organic acids such as formic acid, acetic acid and higher acids, alcohols, aldehydes, ketones and esters. Their presence in the product is undesirable.

Typically about 70 to 90% of the hydrogen and carbon monoxide in the synthesis gas feed to the hydrocarbon synthesis stage react during said hydrocarbon synthesis stage to produce products, and the remaining about 10 to 30% end up in a tail gas including unreacted hydrogen and carbon monoxide, methane, carbon dioxide, inert gases such as nitrogen and argon, and some residual $C_{2+}$ hydrocarbons. The $C_{2+}$ includes paraffins and olefins. The tail gas is essentially dry, and may therefore contain only traces of water.

By the term "essentially dry" in relation to the hydrocarbon feedstock water content is meant a water concentration in the hydrocarbon feedstock which is lower than 2 wt %, preferably lower than 1 wt %, most preferably lower than 0.5 wt %.

The tail gas from the Fischer-Tropsch hydrocarbon synthesis stage contains generally residual unreacted hydrogen and carbon monoxide in a typical ratio of about 0.5 to 2.0 ($H_2$/CO-molar ratio). Some methane is produced by the Fischer-Tropsch hydrocarbon synthesis process, and some of the methane in the tail gas may be derived from methane from the synthesis gas preparation step.

The tail gas can be recycled to the synthesis feed stream for the Fischer-Tropsch reactor in order to improve the liquid product yield.

Another option disclosed in WO 03/035590 is to use the tail gas for power generation. Here the tail gas is first combusted, and power is generated by expanding the combusted gas in a gas turbine, and/or the combusted gas is used for generation of steam which is expanded through a steam turbine.

WO patent application no. 03/0830113 discloses a Fischer-Tropsch synthesis process whereby tail gas is pretreated to remove olefins contained in the tail gas by hydrogenation or adiabatic pre-reforming, followed by stripping off excess $H_2$, mixing with recycled $CO_2$ and steam, subjecting the gas to steam reforming, and, after removing excess $CO_2$ and water, directing the gas back to the Fischer-Tropsch reactor.

WO patent application no. 01/42175 discloses a process for conversion of natural gas and other fossil fuels to higher hydrocarbons, whereby a portion of or all tail gas is steam reformed in a separate steam reformer, and this steam reformed gas is introduced to the main gas stream before it is directed to the Fischer-Tropsch reactor. Optionally, the tail gas is hydrogenated in order to saturate any unsaturated hydrocarbon before being sent to the separate steam reformer. The operating temperature of the hydrogenator is typically 220 to 250° C. The hydrogenation is not necessarily preferred. However, it is stated that the unsaturated hydrocarbon have a greater tendency towards coking than the saturated hydrocarbons during the subsequent high temperature treatment.

EP patent application no. 1860063 and WO 2006/056594 disclose a process for preparing a paraffin product from a solid carbonaceous feedstock and a process of treating tail gas, respectively. Tail gas is used for preparing a hydrogen comprising gas. The hydrogen comprising gas is used to optimise the hydrogen-to-CO-ratio in the feed gas for the Fischer-Tropsch synthesis and/or to further upgrade the product from the Fischer-Tropsch synthesis by one or more hydroprocessing steps. The hydrogen comprising gas is preferably prepared by reforming the tail gas. Some or all of the olefins in the tail gas are hydrogenated adiabatically at reactor inlet temperatures of about 200° C. and reactor outlet temperatures of about 100° C. or more higher than the inlet temperature and in the presence of steam prior to the process for preparing the hydrogen comprising gas. This is stated to be preferred since olefins are known to cause coking of the catalysts used in the hydrogen manufacturing unit. Carbon monoxide in the tail gas is removed by a high temperature shift or converted either prior to, simultaneously with or after the olefin hydrogenation. This is to avoid coking of the catalysts used in the hydrogen manufacturing according to the Boudouard reaction (1):

$$2CO \rightarrow C + CO_2 \quad (1)$$

Preferably a catalyst is used which combines olefin hydrogenation activity and water gas shift (WGS) activity. The WGS reaction is shown in reaction (2):

$$CO + H_2O \rightarrow H_2 + CO_2 \quad (2)$$

The catalyst is preferably adapted not to promote methanol formation from CO. When the tail gas contains a high amount of CO it is especially important that the catalyst used does not promote formation of methane or methanol since these reactions are highly exothermic which may result in a high temperature which in turn may damage the catalyst. Hydrogenation may be achieved in a first reactor. Steam may be added to the first reactor to suppress Boudouard carbon formation. The temperature of the first reactor is preferably 150 to 250° C. at the inlet and 200 to 500° C. at the outlet. Further CO removal can optionally be achieved in a separate reactor by use of a high temperature shift catalyst. The temperature in the second reactor is preferably in the range 300 to 500° C. In conventional processes the molecular $H_2$/CO ratio of the hydrogen comprising mixture is 4:1 to 9:1.

According to the present invention the olefins contained in an essentially dry hydrocarbon feedstock, preferably tail gas, are hydrogenated in a first reactor and subsequently water is added and CO is converted by the water gas shift reaction in a second reactor. The gas is then converted to synthesis gas.

The conversion of an essentially dry hydrocarbon feedstock comprising olefins, hydrogen and carbon monoxide into a synthesis gas presents a number of challenges.

In order to convert the hydrocarbon feedstock into a synthesis gas, the feedstock gas must be heated to become reactive in the catalytic and/or non-catalytic conversion steps. The olefins in the hydrocarbon feedstock may cause carbon formation when the gas is heated, which results in carbon laydown in heaters or other process equipment. The olefins may also form carbon on catalysts and thereby damage or destroy the catalysts.

The carbon monoxide in the hydrocarbon feedstock may cause metal dusting when the gas is heated and thereby damage or destroy the tubes in heaters and transfer line and/or reactors. Metal dusting is initiated by carbon formation by the Boudouard reaction (1) and/or the reduction of carbon monoxide by reaction (3):

$$CO+H_2 \rightarrow C+H_2O \quad (3)$$

Carbon monoxide may also result in carbon formation on catalysts.

It is therefore necessary to remove or lower the contents of olefins and the carbon monoxide in the hydrocarbon feedstock to a level where these reactions no longer constitute a problem.

The olefins in the gas can be removed, partially or fully, by hydrogenation with hydrogen into the corresponding paraffin according to reaction (4)

$$C_mH_n+H_2 \rightarrow C_mH_{n+2} \quad (4)$$

Hydrogen for the hydrogenation is already present in the tail gas.

The CO content can be reduced by the water gas shift reaction (2).

It is necessary to add steam to the tail gas in order to convert the CO.

According to the prior art it is possible to carry out the olefin hydrogenation and the shift reaction combined in a single step using one catalyst.

This has, however, several drawbacks:
the presence of olefins in the hydrocarbon feedstock lowers the water gas shift reaction rate,
the presence of water necessary for the shift reaction may lower the reaction rate of the hydrogenation,
a lower limit for the inlet temperature is set by the requirement of avoiding condensation so as to prevent liquid water from damaging the catalyst,
it is necessary to raise the inlet temperature of the water-gas-shift (WGS) reactor to an increased temperature to ensure a sufficiently high reaction rate for the water gas shift reaction, compared to the necessary inlet temperature of a reactor performing dry hydrogenation of olefins alone,
the exit temperature of the reactor must be kept below a certain level in order to reduce the CO content to a given level defined by the equilibrium of the water gas shift reaction.
the temperature increase over the reactor is increased due to the cumulated effect of the exothermic hydrogenation and water gas shift reactions. This may result in a rather complicated reactor layout and/or more inefficient energy use, There is the risk of formation of ethanol or other higher alcohols e.g. propanol, butanol, pentanol, hexanol, according to reaction (5):

$$C_2H_4+H_2O \leftrightarrow C_2H_5OH \quad (5)$$

This reaction is exothermic and may further increase the reactor temperature.

Any ethanol formed can be dehydrated to ethene and water downstream the combined hydrogenation/shift reactor as shown in reversible reaction (6):

$$C_2H_5OH \leftrightarrow C_2H_4+H_2O \quad (6)$$

This causes the problems described above with regards to carbon laydown and catalyst damage from ethylene or other olefins.

These drawbacks can be avoided by first hydrogenating the olefins in the essentially dry tail gas in a first reactor, and by subsequently adding water and converting the CO by the water gas shift reaction in a second reactor.

The hydrogenation of the olefins in the first reactor is most advantageously done at a low temperature, i.e. at or below 190° C. Operating the reactor at a high temperature, i.e. above 190° C., has several drawbacks:
methanol can be formed from the reactants in the gas by reactions (7) and (8). These reactions are not desirable, and the reaction rates increase with the temperature.

$$CO+2H_2 \rightarrow CH_3OH \quad (7)$$

$$CO_2+3H_2 \rightarrow CH_3OH+H_2O \quad (8)$$

ethanol or other higher alcohols can be formed from the reactants in the gas by reaction (9). Formation of ethanol is not wanted. The reaction rate increases with increasing temperature. The reaction is exothermic and in worst case this may accelerate the reaction causing a thermal runaway of the reactor.

$$2CO+4H_2 \rightarrow C_2H_5OH+H_2O \quad (9)$$

nickel and/or iron compounds may be present in the gas, for example in form of $Ni(CO)_4$ and/or $Fe(CO)_5$ which may deposit Fe and/or Ni particles on the catalyst in the reactor. The Ni and/or Fe compounds may also be present in the gas in the form of particles. Fe catalyses a Fisher-Tropsch (FT) reaction (10) in the reactor if the temperature is sufficiently high for example above 190° C. or above 200° C. The long-chained hydrocarbons formed by these reactions may deposit in the catalyst and block the pore system, which results in loss of activity for hydrogenation of the catalyst.

$$CO+2H_2 \rightarrow -CH_2-+H_2O \quad (10)$$

Nickel may catalyse carbon formation and/or the FT synthesis at elevated temperature.

It is thus an object of the present invention to provide a process for converting a hydrocarbon feedstock comprising olefins, hydrogen and carbon monoxide into a synthesis gas, in which the above mentioned drawbacks of the known techniques have been overcome.

The invention concerns, as defined in claim 1, a process for the preparation of synthesis gas from an essentially dry hydrocarbon feedstock comprising olefins, hydrogen and carbon monoxide, the process comprising the following steps:
(a) selectively hydrogenating the olefins in the hydrocarbon feedstock at a temperature between 60 and 190° C. to obtain a hydrogenated hydrocarbon feedstock comprising hydrogen, carbon monoxide and saturated hydrocarbons,
(b) adding steam to the hydrogenated hydrocarbon feedstock, (c) performing a water gas shift reaction in the presence of steam on the hydrogenated hydrocarbon feedstock to obtain a shifted, hydrogenated hydrocarbon mixture, and (d) converting the shifted, hydrogenated hydrocarbon mixture to obtain a synthesis gas.

Accordingly, the hydrogenating step (a) is purposively conducted without introduction of steam or water.

As used herein the term "essentially dry hydrocarbon feedstock" means a water concentration in the hydrocarbon feedstock which is lower than 2 wt %, e.g. lower than 1 or lower than 0.5 wt %.

When preparing synthesis gas according to the inventive process, converting the shifted, hydrogenated hydrocarbon mixture to obtain a synthesis gas can be done by partial oxidation (catalytic or non-catalytic) and/or reforming.

Reforming can be selected from any conventional reforming process such as adiabatic reforming, fired tubular steam reforming, two-step reforming, heat exchange reforming, or autothermal reforming and combinations thereof. If autothermal reforming is chosen then it is preferred that it is carried out in a reactor by partial oxidation using substoichiometric amounts of oxygen in a flame reaction, followed by a catalytic steam reforming step in a fixed bed in the reactor downstream the partial oxidation step.

The resulting synthesis gas is suitable for use in the synthesis of hydrocarbons by catalytic processes and can be used alone or it can be mixed with a gaseous feedstock derived from a carbonaceous feedstock converting the combined synthesis gas and the gaseous feedstock to obtain a product comprising one or more hydrocarbons. Specifically, such catalytic processes comprise the Fischer-Tropsch reaction using conventional catalysts comprising Fe or Co, but the invention also applies to other processes for production of hydrocarbons in which undesired hydrocarbons may be converted into synthesis gas, e.g. other processes for the production of synthetic fuels or processes for the production of hydrocarbon-containing chemicals.

Examples of such processes are processes for the production of synthetic gasoline, comprising the MTG (Methanol-To-Gasoline [S. Yurchak, Stud. Surf. Sci. Catal. 36 (1988) 251]) and TIGAS (Topsoe Integrated Gasoline Synthesis[J. Topp-Jørgensen, Stud. Surf. Sci. Catal. 36 (1988) 293]) processes. Both these processes require a synthesis gas feed (for MTG process to produce the methanol feedstock) and co-produce one or more streams containing hydrogen and carbon monoxide and undesired or less desired hydrocarbons such as $C_2$-$C_4$ hydrocarbons that may advantageously be converted into synthesis gas in accordance with the invention. An example of a process for the synthesis of hydrocarbon-containing chemicals is the MTO (methanol-to-olefins) process in which non-olefinic hydrocarbons may serve as an additional source for synthesis gas to provide the methanol feedstock.

Catalysts suitable for selectively hydrogenating the olefins to saturated hydrocarbons are based on copper, for instance a Cu/ZnO catalyst, or a combination of copper and noble metal for instance platinum or palladium.

A copper based catalyst, such as a Cu/ZnO catalyst, is particularly active in the selective hydrogenation of olefins to paraffins with a reduced formation or without the formation of methanol or higher alcohols having two or more carbon atoms in their structure.

Suitable shift catalysts comprise copper, zinc, aluminium for instance in their oxide form as the catalytically active material. Examples are LK-811 (based on Cu, Zn and Cr), LK-821-2 (based on Cu, Zn and Al) and LK-823 (based on Cu, Zn, Al and Cs), all available from Haldor Topsøe A/S.

The synthesis gas prepared by the invention has a molecular hydrogen-to-carbon monoxide-molar ratio lower than or equal to 2.6 ($H_2$/CO-molar ratio). Preferred ratios are between 1.5 and 2.6, most preferably between 1.8 and 2.3.

A gasoline synthesis hydrogen-to-carbon monoxide-molar ratio of the prepared synthesis gas is preferably lower than 2.6, more preferably 1 to 1.5, and most preferably approximately 1.

When the synthesis gas prepared by the invention is mixed with a gaseous feedstock derived from a carbonaceous feedstock, and the synthesis gas mixed with said gaseous feedstock is converted in one or more catalytic conversion steps to obtain one or more hydrocarbon products, the gaseous feedstock derived from a carbonaceous feedstock has preferably a hydrogen-to-carbon monoxide-molar ratio below 2.3, and more preferably between 1.7 and 2.3.

After gasification of the carbonaceous feedstock into gaseous feedstock, an initial molecular hydrogen-to-carbon monoxide-molar ratio ($H_2$/CO-molar ratio) of 0.3 to 0.6 is obtained in some cases, which is then further adjusted to a molecular hydrogen-to-carbon monoxide-molar ratio of 1.7 to 2.3.

In other cases the $H_2$/CO-molar ratio may directly after gasification be in the range of 0.6 to 2.0.

Specifically, the embodiments disclosed in the following can be combined with one or more embodiments disclosed before or after either embodiment:

In the general embodiment of the invention we provide a process for the preparation of synthesis gas from an essentially dry hydrocarbon feedstock comprising olefins, hydrogen and carbon monoxide, the process comprising the following steps:

(a) selectively hydrogenating the olefins in the hydrocarbon feedstock at a temperature between 60 and 190° C. to obtain a hydrogenated hydrocarbon feedstock comprising hydrogen, carbon monoxide and saturated hydrocarbons, (b) adding steam to the hydrogenated hydrocarbon feedstock, (c) performing a water gas shift reaction in the presence of steam on the hydrogenated hydrocarbon feedstock to obtain a shifted, hydrogenated hydrocarbon mixture, and (d) converting the shifted, hydrogenated hydrocarbon mixture to obtain a synthesis gas.

As mentioned above "essentially dry hydrocarbon feedstock" means a water concentration in the hydrocarbon feedstock which is lower than 2 wt %, e.g. lower than 1 or lower than 0.5 wt %.

In an embodiment of the invention, the conversion of the shifted, hydrogenated hydrocarbon mixture to obtain a synthesis gas (step (d)) comprises partial oxidation.

In an embodiment of the invention, the conversion of the shifted, hydrogenated hydrocarbon mixture to obtain a synthesis gas comprises a non-catalytic partial oxidation step.

In an embodiment of the invention, the conversion of the shifted, hydrogenated hydrocarbon mixture to obtain a synthesis gas comprises a catalytic partial oxidation step.

It is to be understood that partial oxidation is a generic term which comprises non-catalytic partial oxidation and catalytic partial oxidation.

In an embodiment of the invention, the conversion of the shifted, hydrogenated hydrocarbon mixture to obtain a synthesis gas is done by catalytic reaction.

In an embodiment of the invention, the conversion of the shifted, hydrogenated hydrocarbon mixture to obtain a synthesis gas is done by reforming.

In the embodiments of the invention, the reforming is selected from the group consisting of autothermal reforming, adiabatic steam reforming, heat exchange reforming, fired reforming for example tubular reforming, and combinations thereof.

In an embodiment of the invention the reforming step is conducted by autothermal reforming, and the shifted, hydrogenated hydrocarbon mixture of step (c) is passed to a fired heater prior to conducting said autothermal reforming.

In an embodiment of the invention, the reforming is done by a combination of heat exchange reforming and autothermal reforming, and in which the heat exchange reformer receives at least part of the required energy from the effluent stream from the autothermal reformer. Compared to a situation where no such arrangement comprising heat exchange reformer is used, but where the stream from step (c) is simply heated in a fired heater before conducting step (d) in an autothermal reforming step, an increase of 6 to 8% in plant production (liquid hydrocarbons via FT synthesis downstream) can be achieved.

Hence, in this particular embodiment the use of low temperature in the hydrogenation step (a), low temperature in the shift step (c) and use of heat exchange reforming and autothermal reforming where heat for heat exchange reforming is supplied by the effluent stream from the autothermal reformer, results in particular advantages in terms of plant production as described above. An adiabatic pre-reforming step is preferably also provided prior to the heat exchange reforming, e.g. after step (c).

In an embodiment of the invention, the reforming is done by two-step reforming, for example a tubular reformer in series with a secondary reformer.

In an embodiment of the invention, the reforming is done by two-step reforming as mentioned above, i.e. a tubular reformer (fire reformer) in series with a secondary reformer, and after the hydrogenation step (a) a fraction of the hydrogenated hydrocarbon feedstock bypasses step (c) and optionally steam step (b) and is added downstream the tubular reformer and upstream the secondary reformer. The fraction of the hydrogenated hydrocarbon feedstock is thus added to the effluent from the tubular reformer creating the inlet stream into the secondary reformer. The tubular reformer is located directly upstream the secondary reformer.

In an embodiment of the invention, the water-gas-shift reaction in the presence of steam of the hydrogenated hydrocarbon feedstock in WGS-step (c) is done in a reactor provided with means for cooling the hydrocarbon feedstock during reaction.

In an embodiment of the invention, the water gas shift reaction is carried out a temperature below 350° C., preferably below 300° C., and more preferably between 230 and 350° C., such as between 230 and 300° C., most preferably between 185 and 275° C. This enables that the exit gas from the hydrogenating step can be passed to a medium or low temperature shift without requiring addition of much heat. By low temperature shift, i.e. below 300° C. it is possible to bring down the CO content in the gas to a level which is not possible with high temperature shift (temperatures above 300° C.). A low CO content in the gas limits the extent of the Boudouard reaction (1).

In an embodiment of the invention, water-gas-shift reaction in the presence of steam of the hydrogenated hydrocarbon feedstock in WGS-step (c) is done in two or more adiabatic reactors with adjustment of temperature in-between two or more reactors.

In a further embodiment of the invention, an adiabatic reformer is arranged in series with and directly downstream a WGS reactor. The adiabatic reformer can for instance be a pre-reformer, such as an adiabatic pre-reformer, for converting higher hydrocarbons into a mixture of methane and carbon oxides, hydrogen and steam.

In an embodiment of the invention, the obtained synthesis gas has a molecular hydrogen-to-carbon monoxide-molar ratio lower than or equal to 2.6.

In an embodiment of the invention, the hydrogenation reaction is catalysed by a catalyst comprising either copper or a combination of copper and noble metals.

In an embodiment of the invention, the water-gas-shift reaction is catalysed by a catalyst comprising metallic or oxide form of metals selected from the group consisting of copper, zinc, aluminium, chromium, cesium and combinations thereof.

In an embodiment of the invention, the essentially dry hydrocarbon feedstock comprising olefins, hydrogen and carbon monoxide is obtained from hydrocarbon synthesis, for instance from tail gas from Fischer-Tropsch synthesis or a recycle gas from gasoline synthesis. Thus, in a particular embodiment said essentially dry hydrocarbon feedstock is tail gas from Fischer-Tropsch synthesis. The recycle gas comprises light products such as light paraffins and light olefins and unconverted synthesis gas.

In an embodiment of the invention, selectively hydrogenating the olefins in the hydrocarbon feedstock in hydrogenation step (a) is conducted in an isothermal reactor, preferably at a temperature in the range of 100 to 150° C. This enables high conversion of olefins such as $C_4H_8$ while at the same time avoiding significant formation of methanol or higher alcohols and other by-products.

In an embodiment of the invention, selectively hydrogenating the olefins in the hydrocarbon feedstock in hydrogenation step (a) is conducted in an adiabatic reactor in which the inlet temperature is preferably in the range of 70 to 120° C., more preferably 80 to 100° C., and the outlet temperature is 140 to 190° C., more preferably 150 to 185° C.

In an embodiment of the invention, the pressure in the hydrogenation step (a) is in the range of 20 to 70 bar, preferably 20 to 50 bar, more preferably 20 to 40 bar.

In yet another embodiment, the invention also encompasses the use of the synthesis gas prepared according to anyone of the process embodiments in the preparation of gasoline, said embodiment comprising the steps of combining the synthesis gas with a gaseous feedstock derived from a carbonaceous feedstock and converting the synthesis gas with the gaseous feedstock in at least two catalytic conversion steps to obtain a product comprising one or more $C_1$-$C_{11}$ hydrocarbons.

BRIEF DESCRIPTION OF THE DRAWINGS

The following Figures disclose two embodiments of the invention.

Figure 1:
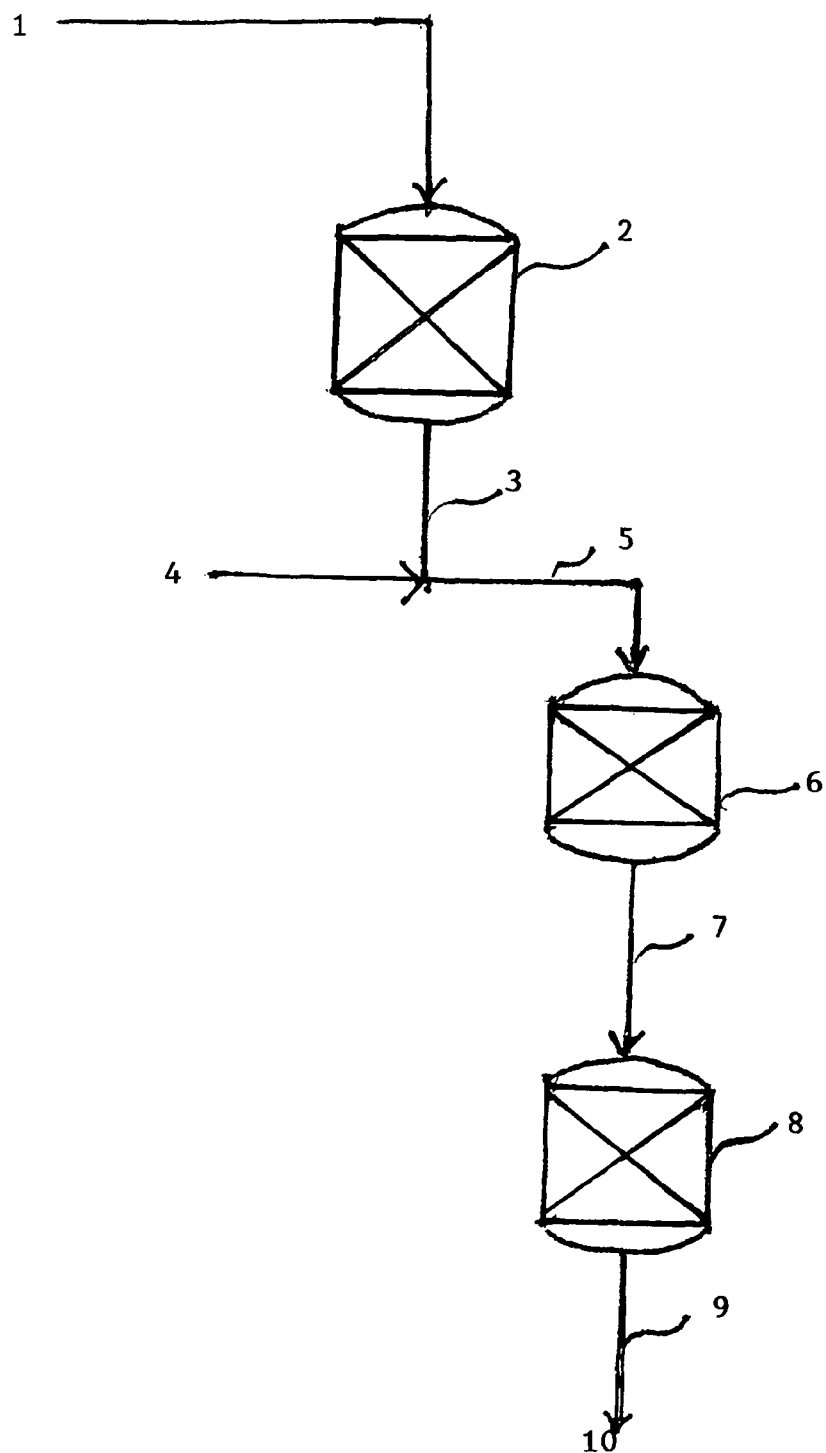
FIG. 1 shows the process steps for preparation of synthesis gas according to an embodiment of the invention.

The essentially dry hydrocarbon feedstock 1 comprising olefins, methane, hydrogen, carbon monoxide and light hydrocarbons, is transferred to hydrogenation reactor 2 for selective catalytic hydrogenation of the olefins. The operation temperature of the selective hydrogenation reaction is 60 to 190° C. and hydrogenated hydrocarbon feedstock 3 is obtained from the hydrogenation reactor 2. Essentially no alcohols are formed.

The hydrogenated hydrocarbon feedstock 3 is mixed with steam 4 and the mixture 5 is subjected to a water gas shift reaction in shift reactor 6. A shifted hydrogenated hydrocarbon mixture 7 is obtained from shift reactor 6 and this mixture 7 is reformed in reforming reactor 8 to obtain a synthesis gas 9. Synthesis gas 9 can optionally be subjected to further processing 10, for instance at a Fischer Tropsch plant for conversion to liquid hydrocarbons.

Figure 2:
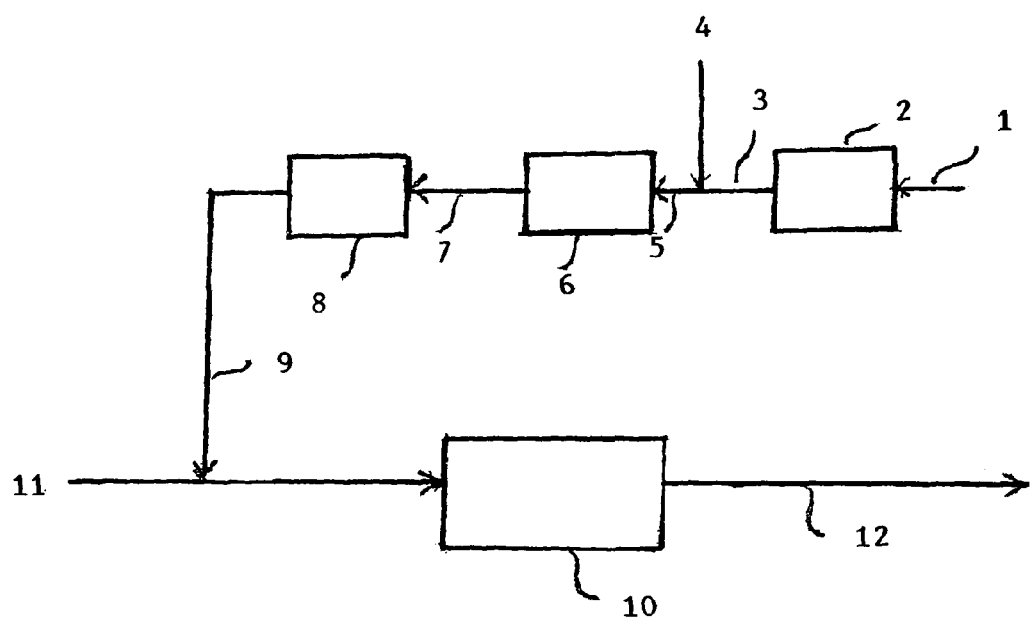
FIG. 2 shows the process steps for preparation of gasoline using the synthesis gas obtained by the inventive process.

Turning to FIG. 2, the obtained synthesis gas 9 is as described in connection with FIG. 1. Synthesis gas 9 is combined with a gaseous feedstock 11 derived from a carbonaceous feedstock 11. The combined gas is converted in at least two catalytic conversion steps inside unit 10 to a product comprising one or more $C_1$-$C_{11}$ hydrocarbons 12.

EXAMPLES

Example 1

A lab test on dry hydrogenation was done using the feed gas shown in Table 1. The catalyst used was a Cu-based catalyst, specifically A Cu/ZnO catalyst.

The gas was passed through a bed of the catalyst in a reactor operated at isothermal conditions, and the effluent gas composition was measured. The space velocity was 2000 Nl/kg/h. The pressure was 20 bar.

The conversion of propylene to propane, and of butylene to butane is shown in Table 2.

TABLE 1

| Component | Concentration Mole % |
|---|---|
| Inerts (Ar, $N_2$, $CH_4$) | 55.7 |
| CO + $H_2$ | 41.8 |
| $C_3H_6$ | 0.52 |
| 1-$C_4H_8$ | 0.15 |
| $C_2H_6$ | 0.10 |
| $C_3H_8$ | 0.31 |
| $CO_2$ | 1.4 |

TABLE 2

| Test number | Temperature ° C. | $C_3H_6$ conversion % | $C_4H_8$ conversion % |
|---|---|---|---|
| #1 | 65 | 10 | 40 |
| #2 | 102 | 67 | 94 |
| #3 | 130 | 96 | 99 |
| #4 | 150 | >99 | >99 |

The tests clearly demonstrate that the catalyst is active in the desired temperature interval for use in the process of this invention.

Example 2

A lab test on dry hydrogenation was done using the feed gas shown in Table 3. The catalyst used was as described in Example 1.

The gas was passed through a bed of the catalyst in a reactor operated at isothermal conditions, and the effluent gas composition was measured. The space velocity was 2000 Nl/kg/h. The pressure was 20 bar.

TABLE 3

| Component | Concentration Mole % |
|---|---|
| Inerts (Ar, $N_2$, $CH_4$) | 48.4 |
| CO + $H_2$ | 48.7 |
| $C_3H_6$ | 0.17 |
| 1-$C_4H_8$ | 0.17 |
| $C_2H_6$ | 0.11 |
| $C_3H_8$ | 0.36 |
| $CO_2$ | 1.7 |

The effluent gas was analysed for methanol and higher hydrocarbons. Measurements were done at reactor temperatures of 62, 80, 100, and 150° C. No methanol or higher alcohols were detectable at temperatures of 62, 80, and 100° C. At a temperature of 150° C., the methanol concentration was measured to be 0.16 mole %. No higher alcohols were found.

These tests show that when the hydrogenation is done at low temperature, the formation of methanol and other by-products are very low.

Example 3

Simulations of hydrogenation of the model gases shown in Table 4 have been done. The simulations have been done assuming adiabatic conditions. As can be seen from Table 5, it is possible to operate below 200° C. particularly at or below 190° C. in the entire reactor (where high olefin conversion without methanol formation is obtained) by selecting an appropriate inlet temperature.

TABLE 4

| Component | Gas A Mole % | Gas B Mole % |
|---|---|---|
| Inerts (Ar, $N_2$, $CH_4$) | 46.5 | 45 |
| Propene | 1 | 2 |
| Hexene | 0.5 | 1 |
| $CO_2$ | 2 | 2 |
| CO + $H_2$ | 50 | 50 |

TABLE 5

| Case | Gas | Inlet temp ° C. | Outlet temp ° C. |
|---|---|---|---|
| 1 | Gas A | 100 | 154 |
| 2 | Gas B | 80 | 184 |

Comparison Example 4

Lab test was done to study the influence of Fe contamination of hydrogenation catalysts. A Cu-based catalyst was impregnated with 575 ppmw Fe. The catalyst used was as described in Example 1.

The catalyst performance was tested in separate tests using the gas compositions shown in Table 4. A test was done under isothermal conditions at 210° C. and at a pressure 65 bar. The space velocity was 6250 Nl/kg/h. The test duration was 140 h. After the tests, the catalyst was analysed for carbon. The catalyst at the exit of the reactor showed a carbon uptake of ~6% w/w.

TABLE 6

| Component | Gas 1 Mole % | Gas 2 Mole % |
|---|---|---|
| $H_2$ | 60 | 66 |
| Ar | 3.8 | 3.5 |
| CO | 31 | 26 |
| $CO_2$ | 4.9 | 4.5 |

Another test was done with gas composition 2, at 230° C. and pressure of 65 bar, for 500 h. The space velocity was 12500 Nl/kg/h. The catalyst at the exit of the bed showed a carbon uptake of ~13% w/w. The carbon was in form of wax, i.e. long-chained hydrocarbons.

The invention claimed is:

1. Process for the preparation of synthesis gas from an essentially dry hydrocarbon feedstock comprising olefins, hydrogen and carbon monoxide, the process comprising the following steps:
   (a) selectively hydrogenating the olefins in the hydrocarbon feedstock at a temperature between 60 and 190° C. to obtain a hydrogenated hydrocarbon feedstock comprising hydrogen, carbon monoxide and saturated hydrocarbons, wherein selectively hydrogenating the olefins in the hydrocarbon feedstock is conducted without introduction of steam or water in either an isothermal reactor, or in an adiabatic reactor in which the inlet temperature is in a range of 70 to 120° C., and the outlet temperature is in a range of 140 to 190° C.;
   (b) adding steam to the hydrogenated hydrocarbon feedstock;
   (c) performing a water gas shift reaction in the presence of steam on the hydrogenated hydrocarbon feedstock to obtain a shifted, hydrogenated hydrocarbon mixture; and
   (d) performing partial oxidation or reforming of the shifted, hydrogenated hydrocarbon mixture, wherein the partial oxidation or reforming forms a synthesis gas having a molecular hydrogen-to-carbon monoxide-molar ratio lower than or equal to 2.6.

2. Process according to claim 1, wherein the reforming step is selected from the group consisting of autothermal reforming, secondary reforming, adiabatic steam reforming, heat exchange reforming, fired reforming and combinations thereof.

3. Process according to claim 1, wherein the reforming is carried out by a combination of heat exchange reforming and autothermal reforming, and in which the heat exchange reformer receives at least part of the required energy by heat exchange with the effluent stream from the autothermal reformer.

4. Process according to claim 1, wherein the reforming is done by two-step reforming comprising tubular reforming followed directly by secondary reforming, and a fraction of the hydrogenated hydrocarbon feedstock obtained in step (a) bypasses step (c) and optionally step (b) and is added downstream the tubular reforming step and upstream the secondary reforming step.

5. Process according to claim 1, wherein the water gas shift reaction is carried out at a temperature below 350° C.

6. Process according to claim 1, wherein the hydrogenation reaction is catalysed by a catalyst comprising either copper or a combination of copper and noble metals.

7. Process according to claim 1, wherein the water gas shift reaction is catalysed by a catalyst comprising metallic or oxide form of metals selected from the group consisting of copper, zinc, aluminium, chromium, cesium and combinations thereof.

8. Process according to claim 1, wherein the essentially dry hydrocarbon feedstock comprising olefins, hydrogen and carbon monoxide is obtained from hydrocarbon synthesis.

9. Process according to claim 8 wherein said essentially dry hydrocarbon feedstock is tail gas from Fischer-Tropsch synthesis.

* * * * *